Figure 2:
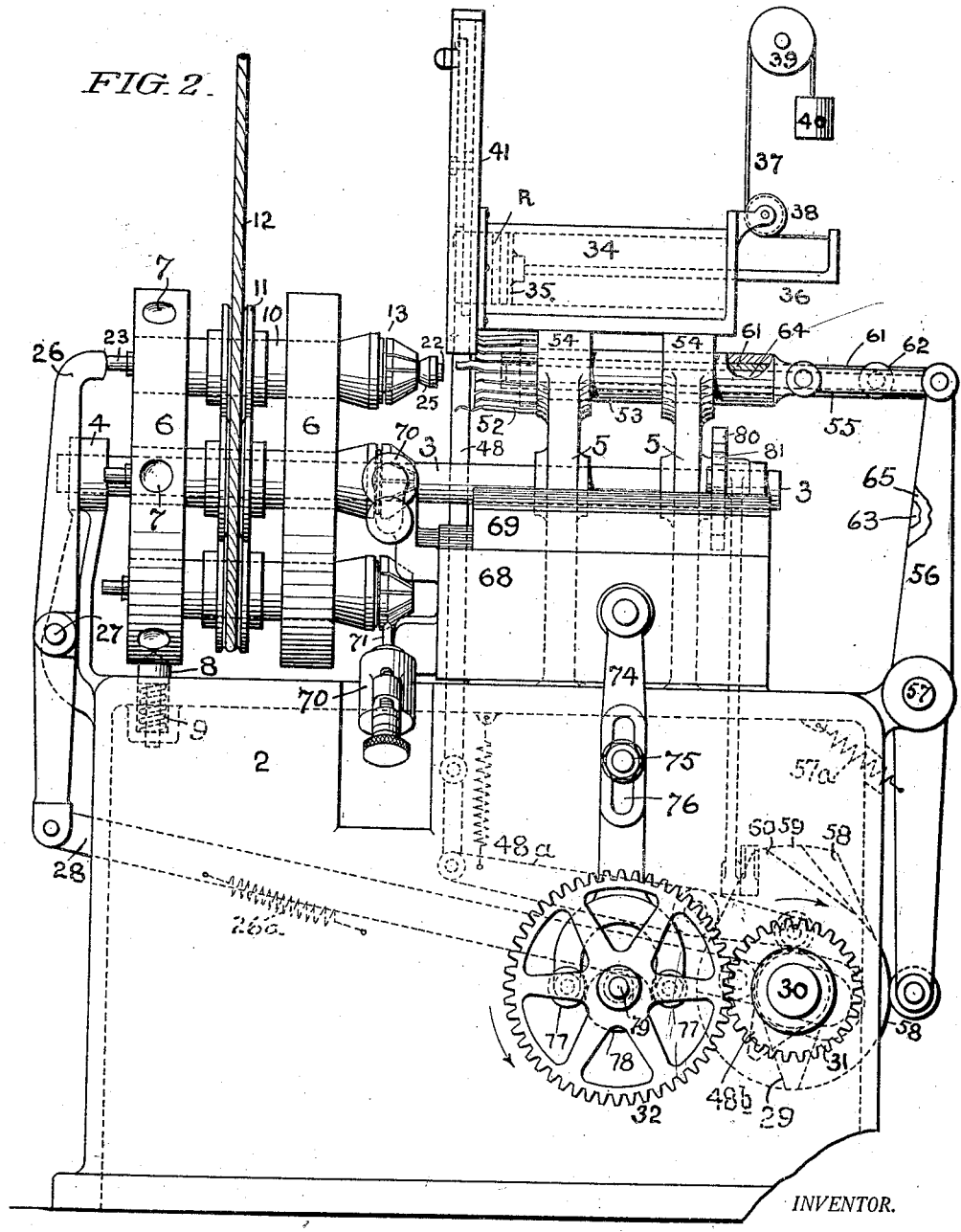

Oct. 14, 1924.
L. KINSLEY
AUTOMATIC LATHE
Filed July 26, 1922    3 Sheets-Sheet 1
1,511,565
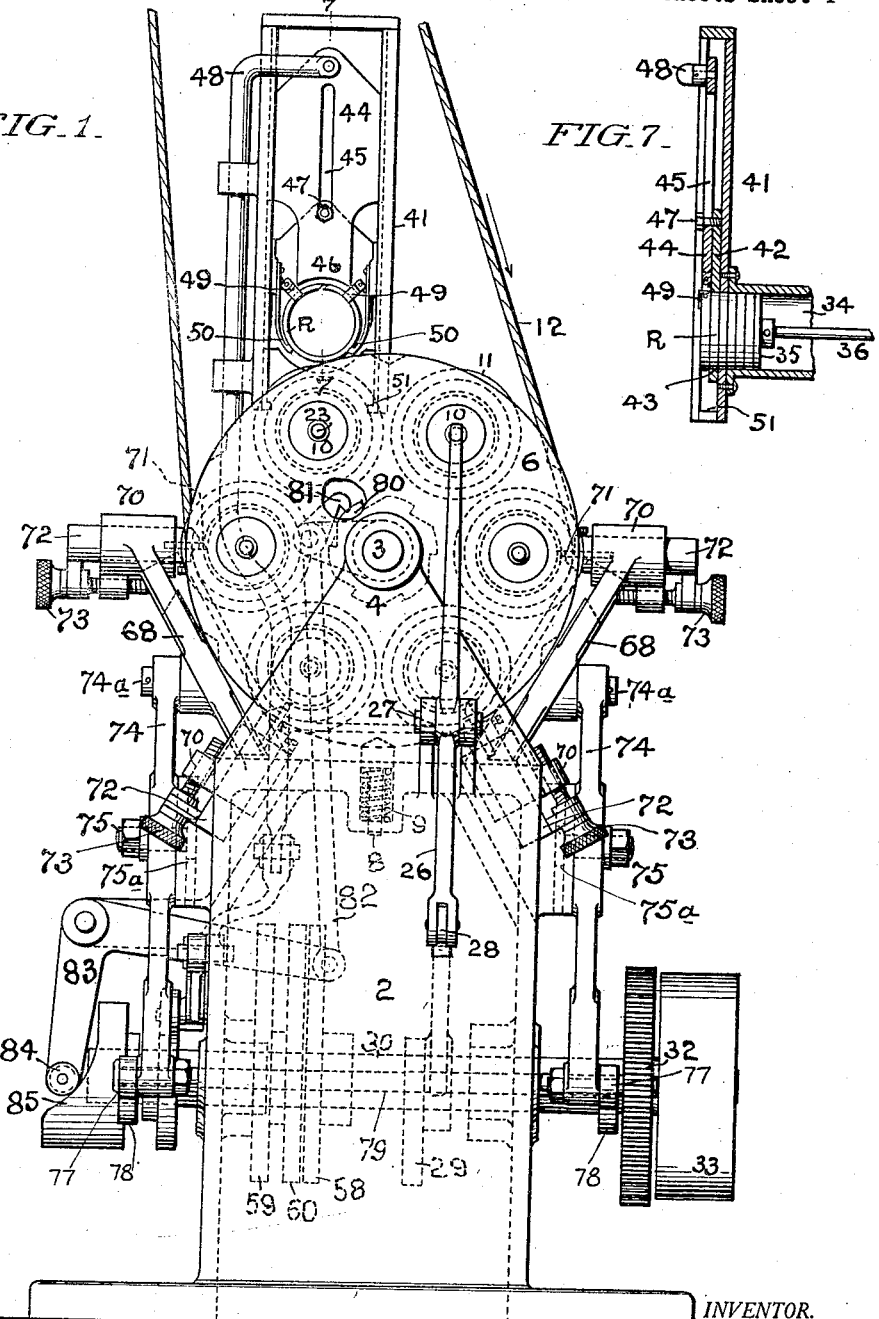
FIG.1.    FIG.7.
INVENTOR.
Lewis Kinsley
BY
ATTORNEY.

Oct. 14, 1924.

L. KINSLEY

AUTOMATIC LATHE

Filed July 26, 1922     3 Sheets-Sheet 2

1,511,565

INVENTOR.

Lewis Kinsley

BY

ATTORNEY.

Oct. 14, 1924.  
L. KINSLEY  
AUTOMATIC LATHE  
Filed July 26, 1922  
1,511,565
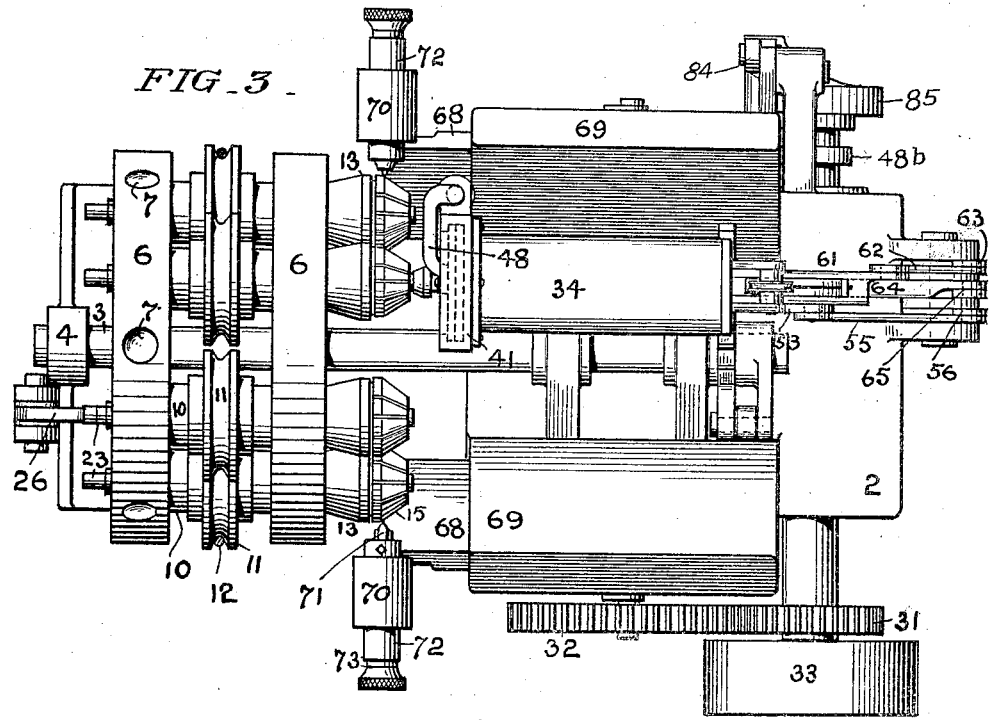
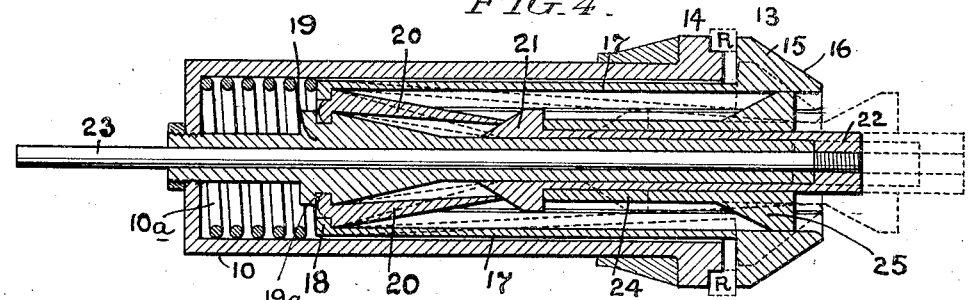
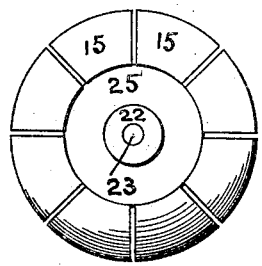
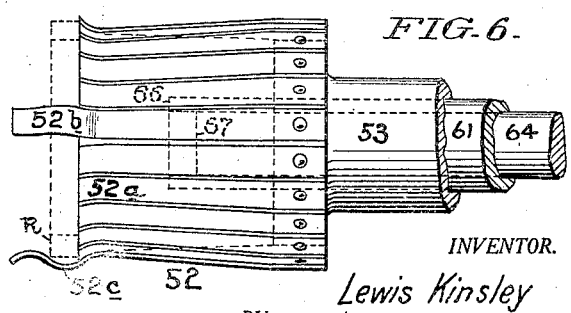
INVENTOR.  
Lewis Kinsley  
BY  
ATTORNEY.

Patented Oct. 14, 1924.

1,511,565

UNITED STATES PATENT OFFICE.

LEWIS KINSLEY, OF PHILADELPHIA, PENNSYLVANIA.

AUTOMATIC LATHE.

Application filed July 26, 1922. Serial No. 577,676.

*To all whom it may concern:*

Be it known that I, LEWIS KINSLEY, a citizen of the United States, and resident of Philadelphia, county of Philadelphia, State of Pennsylvania, have invented an Improvement in Automatic Lathes, of which the following is a specification.

The object of my invention is to provide a construction of automatic lathe for the purpose of turning rings and, more particularly, piston rings such as employed in engines of various makes.

More specifically, my object is not only to enable the piston rings to be turned to accurate diameters by the employment of automatic machinery, but to enable such work to be accomplished in a rapid and inexpensive manner.

More particularly referring to the general construction of my improvements, I provide a turret containing a plurality of chucks for receiving and clamping the piston rings and rotating them during the operation of turning, and with the said turret I combine automatic feeding devices for feeding the piston rings from a magazine successively upon the chucks.

The machine is further provided with a plurality of cutters or turning tools and means for causing said tools to have a traversing motion relatively to the chucks, so as to perform a turning operation wherein a spiral cut of metal is removed from the outer surface of the ring during the rotation of the chuck; and I prefer to employ a plurality of such cutters or turning tools with which each chuck is required to successively cooperate, so that each of said cutting or turning tools removes a small surface portion from each piston ring and whereby the aggregate number of cuts insure a perfect removal of the metal and brings the outer diameter of the piston ring to that which is required.

My invention further is provided with automatic means for bringing the chucks to a condition of rest when positioned to receive the piston rings from the magazine, and also with means for compressing the piston ring to its minimum diameter while being clamped in the chuck and before having its outer surface turned.

As will be understood, the machine is further provided with automatic mechanism for opening and closing the chucks, for intermittently rotating the turret and for putting the chucks into and out of rotation at the predetermined intervals or periods for the purpose of performing the function required of the machine, as hereinafter more fully described.

My invention also consists of improvements hereinafter described whereby the above objects and results are attained, said improvements comprising certain organization and combination of parts which are fully described hereinafter and more particularly defined in the claims.

Referring to the drawings: Fig. 1 is an end elevation of a machine embodying my improvements; Fig. 2 is a side elevation of the same; Fig. 3 is a plan view of the same; Fig. 4 is a longitudinal sectional view showing the details of the chuck; Fig. 5 is an end view of the chuck; Fig. 6 is a side view of a transfer feeding and compression chuck for properly delivering the piston ring to the turning chuck; and Fig. 7 is a vertical section taken through the feeding device on line 7—7 of Fig. 1.

2 is the main frame of the machine and may be of any suitable construction. Journaled in the bearings 4 and 5 is a turret shaft 3 carrying the turret structure 6, which may be of a double flanged construction secured to the shaft. The turret 6 is provided with a plurality of chucks 13 having horizontally arranged bodies 10 journaled in the turret, so that the chucks may be freely rotated. Each of the chucks is provided with a grooved wheel 11 adapted to receive a driving belt 12 which, as shown in Figs. 1 and 2, passes downwardly and around a series of these grooved wheels 11 and thence upward, so that the same belt simultaneously drives a plurality of the chucks, namely, those chucks which are employed during the actual turning operation, as hereinafter more fully explained. By referring to Fig. 1, it will be seen that the grooved wheels of the two upper chucks are out of contact with the belt and consequently are not being rotated. In the particular machine shown, I have provided the turret with six chucks, but it will be understood that I am not to be confined to this precise number of chucks, as a greater or less number may be employed, so long as the general principles of operation of my improved machine are carried out.

The turret may be intermittently rotated by means of a ratchet wheel 80 secured upon the shaft 3 and a pawl 81 engaging said ratchet wheel and put into operation by a rod 82, bell-crank 83 having a roller 84 at the end of one of its arms, and a cam 85 upon the end of the driving cam-shaft 30 which is driven by the belt wheel 33 or by other suitable means, as may be preferred. The operation of this pawl and ratchet feeding means is to intermittently move the turret with each operation a distance, circumferentially considered, equal to the arc formed between the axes of two successive chucks (Fig. 1); and to retain the turret in such adjusted positions during the further reciprocation of the pawl, I provide a spring actuated detent 8 (operated by the spring 9) for engaging recesses 7 in the turret corresponding to each of the chucks. It will be understood, however, that any suitable step by step feeding mechanism, such for example, as the well known "Geneva" intermittent gear, may be employed.

34 is a magazine of tubular construction in which the piston rings R are conveniently placed and adapted to be fed forward by means of a piston 35 and an operating rod 36 which may be fed forward gradually by means of a cable 37 guided about pulleys 38 and 39 and put under tension by a weight 40. By this means a constant forward pressure is applied to the piston rings to feed them through the magazine 34 and into a vertically reciprocating holder 42, by which they may be successively lowered to the position just above the position which they must ultimately assume when being fed upon the chuck, the said reciprocating holder being brought to rest by the shoulders 51 on the magazine frame 41 and at the same time acting to check any further feeding of the piston rings in the magazine until the holder 42 is fully raised again. It will be seen that the holder 42 is provided with two overhanging clips 49 for holding the upper portion of the piston ring, whereas its lower portion is held by two spring arms 50. From this construction, it will be seen that one piston ring is held by these parts 49 and 50 while a second piston ring is immediately to the rear thereof and within the circular opening in the holder 42. 44 is a vertical reciprocating feeding plate arranged for vertical reciprocation in the frame 41 of the magazine and this plate is adapted to be vertically reciprocated by means of the operating rod 48, said rod being actuated by a lever 48$^a$ and a cam 48$^b$ on the cam-shaft 30. The plate 44 has a vertical slot 45 through which a pin or screw 47 extends and carried by the holder 42. It will be understood that when the plate 44 is fully raised, as shown in Figs. 1 and 7, it sustains the holder 42 in position to receive piston rings R from the magazine. When, however, the feeding plate 44 is moved downward, the holder 42 descends with it until it is brought to rest by the stops or shoulders 51. Thereafter, a further downward movement of the plate 44 causes its lower end 46 to push the piston ring R from the clips 49 and downward below the spring fingers 50, so as to be released therefrom. The piston ring thus freed, drops into the cradle formed by the extended spring arms 52$^b$ and 52$^c$ of the transfer chuck 52, as indicated in Fig. 6, said chuck being in axial alinement with the chuck 13 of the turret head which is to receive the piston ring. It will now be understood that after the delivery of the piston ring from the magazine in the manner above described, the plate 44 is moved upward and carries with it the holder 42, returning it to the position indicated in Figs. 1 and 7, and thereupon the pressure on the piston rings forces the ring, which was formerly held in the circular opening in the holder 42, into engaging position with the clips 49 and the spring fingers 50, being followed by an additional piston ring within the opening in the holder.

The transfer chuck consists of a reciprocating body 53 guided in guides 54 of the main frame and having at one end a flange to which is secured a plurality of spring fingers 52$^a$ arranged in a circle and of sufficient strength to compress the piston ring to its minimum diameter. The outer ends of these spring arms 52$^a$ are outwardly curved, so as to readily pass over the perimeter of the piston ring R when the same is being forced over the conical head 16 of the chuck 13, and into the position indicated at R in Fig. 4, preliminary to its being clamped therein, as indicated in said figure. In other words, the transfer chuck first conveys the piston ring R in uncompressed condition over the conical end 16 of the chuck and moves it into dotted position R, in Fig. 4, but in doing so, when said piston ring reaches the shoulder 14 constituting one jaw of the chuck, the further movement of the transfer chuck forces the spring fingers 52$^a$ over the perimeter of the piston ring and compresses it tightly to its minimum diameter; and thereupon and while still being held in such compressed condition by the transfer chuck, the other jaw 15 of the chuck is moved outwardly and backward to firmly grip the piston ring and hold it in its compressed condition and retain it in this condition after the transfer chuck has been withdrawn and during the entire remaining operation of turning off the outer perimeter.

I will now refer to the specific construction of the chuck as clearly shown in Fig. 4. This chuck comprises a cylindrical tubular body 10 having the circumferential notched jaw 14 against which the piston ring R rests and in which it is seated when compressed and clamped therein by the moveable jaw 15 comprised of the tapering ends 16 of a plurality of spring fingers 17 integrally united at the other end in an inwardly directed flanged head 18. The spring fingers 17 constitute a substantially cylindrical body which fits within the body 10 of the fixed jaw and is movable longitudinally therein against the action of the coil spring $10^a$ which normally tends to move the jaws 15 of the chuck outward or away from the fixed jaw 14 when it is desired to release the piston ring. 19 is a central body having an annular groove at $19^a$ and engaging this groove and also the head 18 of the movable jaws of the chuck are levers 20 which, when spread at their free ends, produce a toggle action between the parts 18 and 19, with the result that the head 18 is moved backward or to the left and the jaw 15 approaches the jaw 14 to grip the piston ring. The free ends of the levers 20 rest upon the cone 21 which is sleeved upon the body 19 and is extended to a point beyond the chuck to form a head 22 to which is secured a central rod 23 passing in the reverse direction through the body 19 and projecting to the rear of the turret head. This rod is moved in a direction to the right, Figs. 2 and 4, to relieve the levers 20 by the action of a pivoted lever 26, but when the chuck is required to grip the piston ring, the said parts 21 and 22, together with the rod 23, is moved from the dotted position into the solid position (Fig. 4), and this movement is performed by the central plunger 64, (Figs. 3 and 6), which will be further described. While the cone 21 is intended to cause the jaw 15 to approach the jaw 14 in a direction parallel to the axis of the chuck, a cone 25 forming an extension of a sleeve 24 carried about the body of the cone part 21, is employed to spread the jaw 15 from the dotted position into the full line position in Fig. 4, the dotted position being the normal one when introducing the piston ring into the chuck by the action of the transfer chuck 52, and the solid line position, Fig. 4, being that assumed by the chuck when the piston ring is fully clamped in the chuck for subsequent turning. The cone 25 is moved from the dotted position to the solid line position, Fig. 4, by the action of the tubular plunger 61 (Fig. 6); and it will be noted further, that when the cone 25 is moved from the dotted position to the solid line position, Fig. 4, its body part 24 moves the cone 21 to the left and into approximate engagement with the lever arms 20, so that in the final gripping of the piston ring a relatively small additional movement will be required to the cone 21 by the action of the plunger 64.

The lever 26, which has before been referred to, is the means for operating upon the rod 23 for moving the cone 21 of the chuck to the right to relieve the gripping action upon the piston ring, also through its movement upon the cone 21 causes the cone 25 to be moved from the solid line position to the dotted line position in Fig. 4, and in that manner relieve the outward pressure upon the chuck jaw 15, and thereby permit it to collapse to the dotted line position for fully releasing the piston ring, permitting it to be displaced from the chuck. The lever 26 is operated in one direction by a thrust bar 28 which is reciprocated by means of a cam 29 secured upon the cam shaft 30, and in the other direction by the spring $26^a$. It will be understood that the operation of the lever 26 takes place with each step by step movement of the turret head and corresponding to the time when the chuck carrying the completed piston ring is brought into alinement with it. This further means that the power shaft 30 is given one revolution with each intermittent movement of the turret head.

Referring now to the means for reciprocating the transfer chuck 52, the tubular plunger 61 and the plunger 64 for operating upon the parts 25 and 22 respectively of the chuck 13. It will be understood from Figs. 2 and 3 that there are three levers pivoted upon the transfer shaft 57, said levers being each similar to the lever 56 shown in Fig. 2, and respectively operated by the three cams 58, 59 and 60 upon the power shaft 30, said levers being held in contact with the cams by suitable springs, as indicated at $57^a$. Of these levers, 56 connects by a link 55 with the tubular shaft 53 carrying the transfer chuck 52; lever 63 connects by a link 62 with the tubular plunger 61 for operating the cones 21 and 25 of the chuck 13; and lever 65 connects with the plunger 64 for operating upon the head 22 and cone 21 connected therewith, and embodied in the chuck 13. The cams 58, 59 and 60 are generally similar in the extent of their throw, but are so shaped that they come into action successively whereby the cam 58 operates the lever 56 to first move the transfer chuck 52 and its piston ring into position for delivery of the latter to the chuck 13, then cam 59 operates the lever 63 to move the tubular plunger 61 forward for pushing the cone 25 into the chuck and expanding the clamping jaw 15 thereof, and also moving the cone 21 inwardly to operate the levers 20 from the dotted position to the solid position, Fig. 4, and finally, the cam 60 is caused to operate the lever 65 and move the plunger 64 forward to impart a final movement to the cone 21 for insuring a positive gripping of the piston ring R by the jaws 14 and 15 of the chuck 13, and to cause the rod 23 to be moved to the extreme left hand distance in the several Figs. 2, 3 and 4. It will, therefore, be understood that while the lever 26 operates to adjust the parts for disengaging the finished piston ring, the cams 58, 59 and 60 and the parts operated thereby introduce the new piston rings to be turned upon the chucks and cause them to be clamped in position preliminary to the turning operation for truing their perimeters.

Referring now to the means for turning the perimeters of the piston rings clamped in the chucks, it will be understood from Fig. 1 that the lower four positions of the chucks in the turret and which are in radial alinement with the turning tools 71, are the positions at which to rotate the piston rings in contact with the turning tools 71. In actual practice, the four turning tools shown all operate simultaneously but each removes a part only of the total metal required to be removed in bringing the ring to the finished diameter. For example, the tool 71 at the left hand upper position of Fig. 1 removes approximately one-quarter of the metal to be removed. At the next position in the adjustment of the turret, the tool at the left hand lower position takes off another quarter of the metal to be removed; and so on with each of the successive positions with the cutters at the right hand side of the figure, each cutter removing approximately a quarter of the total metal to be removed. It is to be kept in mind that in looking at Fig. 1, the turret intermittently rotates in the reverse direction to the rotation of the chucks and the travel of the belt 12, the movement of the latter merely being to conform to the cutting edge of the tools and might be reversed if the cutting edges of the tools were reversed. The cutting tools 71 are clamped in holders 72 which are adjustable in hubs 70 integral with the slides 68, the adjustment for the depth of cutting being provided by the adjusting screws 73. The slides 68 are guided in dove-tailed grooved portions in frame 69 extending up from the bed 2, as will be clearly seen from the drawings. The slides 68 are reciprocated by means of levers 74 hinged at their upper ends to the slides and pivoted upon the adjustable fulcrum pins 75 and having at their lower ends rollers 77, between which a cam 78 on the transverse shaft 79 operates to impart an oscillating movement to the lever for reciprocating the slides and the cutting tools. The shaft 79 is provided with a gear 72 meshing with a gear 31 upon the power shaft 30 and from which it derives its motion. The extent of movement imparted to the slides 68 from the cams 78 may be varied by adjusting the fulcrums 75 of the lever 74 vertically. These fulcrums 75 are adjustable in the vertical slotted portions 75ª and the levers 74 are provided with vertical slots 76 in which the fulcrum pins 75 operate. It will be understood that, by these devices, the cutting tools 71 are caused to slowly traverse the perimeters of the piston rings while being rotated by the chucks. While I have shown four cutting tools, it will be understood that my improved machine may be provided with one or more such tools, as may be required, without restricting myself to the exact number. It will also be understood that the turret may be provided with as many chucks as desired, though for practical purposes, I have found six chucks sufficient. It will also be understood that while I have shown a similar manner of rotating certain of the chucks while leaving the ones for receiving the work and from which the finished work is to be discharged without rotation, I do not restrict myself to this manner of rotating the chucks. However, where the work to be performed is reasonably light, the means shown will be sufficiently useful for the purpose.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. In a machine of the character stated, the combination of a rotatable turret, means to rotate the turret intermittently with a step by step motion, a plurality of rotatable chucks carried by the turret and each provided with a circular clamping head, means for rotating the said chucks when brought to certain positions during the intermittent rotation of the turret, means for feeding rings to be operated upon in succession to the chucks and comprising a magazine in which the rings are supported and from which they are successively delivered, means to operate the chucks whereby the rings are clamped in position thereon, cutting tools for turning the rings while in the custody of the rotating chucks and positioned in the plane of rotation of the chucks, means for traversing the cutting tools, and a reciprocating transfer device for receiving the rings successively from the magazine and delivering them to the chucks consisting of a head provided with spring fingers arranged in a circle to form a cup-shaped structure with a yielding peripheral edge and adapted to compress a split ring in delivering it upon the chuck.

2. In a machine of the character stated, the combination of a rotatable turret, means to rotate the turret intermittently with a step by step motion, a plurality of rotatable chucks carried by the turret and each provided with a circular clamping head, means for rotating the said chucks when brought to certain positions during the intermittent rotation of the turret, means for feeding rings to be operated upon in succession to the chucks, means to operate the chucks whereby the rings are clamped in position thereon, cutting tools for turning the rings while in the custody of the rotating chucks and positioned in the plane of rotation of the chucks, means for traversing the cutting tools, and wherein further the said feeding means comprises a magazine for holding a plurality of rings so that they are moveable horizontally, means for moving the rings simultaneously in a horizontal direction, vertically reciprocating feeding means for feeding the rings successively in a downward direction, transfer means arranged in alinement with one of the chucks of the turret and adapted to receive the ring when fed downward, and means for moving the transfer means in a horizontal direction for delivering the ring upon the chuck.

3. The invention according to claim 2, further distinguished by having the transfer means provided with a plurality of spring fingers to comprise a cup shaped structure with a yielding peripheral edge for compressing a split ring when delivering it in position upon the chuck.

4. The invention according to claim 2, further distinguished by having means for operating the chuck to clamp the ring in position thereon after the same has been delivered by the transfer means, and separate means for operating the chuck for releasing the ring after it has been subjected to treatment by the cutting tools.

5. In a machine of the character stated, the combination of a rotatable turret, means to rotate the turret intermittently with a step by step motion, a plurality of rotatable chucks carried by the turret and each provided with a circular clamping head, means for rotating the said chucks when brought to certain positions during the intermittent rotation of the turret, a magazine for holding a plurality of rings so that they are movable horizontally, means for moving the rings simultaneously in a horizontal direction, vertical reciprocating feeding means for feeding the rings successively in a downward direction, transfer means arranged in alinement with one of the chucks of the turret and adapted to receive the ring when fed downward, means for moving the transfer means in a horizontal direction for delivering the ring to the chuck, means for operating the chuck to clamp the ring in position thereon after the same has been delivered by the transfer means, and separate means for operating the chuck for releasing the ring after it has been subjected to treatment by the cutting tool, said separate means being put into action for releasing the finished ring simultaneously with the operation of the means for causing another of the chucks to be operated to clamp a ring when receiving it from the transfer means, the operating means for causing one of the chucks to be operated to clamp the ring when receiving it from the transfer means is put into action simultaneously with the operation of the separate means for causing another of the chucks to be operated for releasing the finished ring therefrom, whereby the operation of the machine may be continuous.

6. In a machine of the character described, a turret head, means for intermittently rotating it with a step by step motion, and a plurality of chucks journaled in the turret head and each comprising a rotatable body part providing one circular jaw, each having a cylindrical part fitting within the body part and provided with a plurality of spring arms each having radial parts which constitute an adjustable circular clamping jaw between which and the jaw on the body a ring shaped article may be clamped, a toggle by which the cylindrical part and its spring clamping jaw is moveable longitudinally to move its jaw to or from the circular jaw on the body, a cone-shaped device for operating the toggle for causing the jaws to be moved toward each other, a second cone-shaped part for causing the spring arms to be spread apart to expand the adjustable jaw, combined with means for moving the two cone shaped parts successively in one direction to expand the spring jaw and bring the jaws into clamping position, and means for simultaneously moving the two cone shaped parts in the other direction for collapsing the chuck to release the article.

7. The invention according to claim 6, wherein there is further provided means for rotating all of the chucks except those being operated for clamping an object and for releasing an object, and cutting means for each of the rotating chucks whereby the objects carried thereby are turned to predetermined diameters.

8. The invention according to claim 6, wherein further the means for successively moving the two cone parts is arranged for first moving the two cones in the same direction whereby the spring jaw is expanded and the jaws moved into light clamping position and then the cone for operating the toggle given a further movement to more fully clamp the object.

9. The invention according to claim 6, further having means for feeding split ring shaped objects, and a transfer device for receiving the split rings and forcing them upon respective chucks when in position for receiving and clamping them, said transfer device provided with means for compressing the split ring and holding it in compressed condition during the clamping action of the jaws of the chuck.

10. In a machine for turning split piston rings, the combination of a rotatable chuck having clamping jaws, means for feeding split rings in succession, a transfer device for receiving the rings and delivering them one at a time to the chuck said transfer device having means for compressing the split ring prior to its being positively clamped in the chuck, and means for turning the outer peripheral surface of the ring.

11. The invention according to claim 10, wherein further there is provided means for automatically collapsing the chuck for releasing the finished ring, and means for timing the operation of the transfer device, the clamping action of the chuck and the collapsing thereof.

In testimony of which invention, I hereunto set my hand.

LEWIS KINSLEY.